United States Patent [19]
Graves et al.

[11] Patent Number: 5,467,406
[45] Date of Patent: Nov. 14, 1995

[54] METHOD AND APPARATUS FOR CURRENCY DISCRIMINATION

[75] Inventors: Bradford T. Graves, Arlington Heights; Richard A. Mazur, Naperville; Douglas U. Mennie, Barrington, all of Ill.

[73] Assignee: Cummins-Allison Corp, Mt. Prospect, Ill.

[21] Appl. No.: 207,592

[22] Filed: Mar. 8, 1994

Related U.S. Application Data

[63] Continuation-in-part of Ser. No. 127,334, Sep. 27, 1993, which is a continuation of Ser. No. 885,648, May 19, 1992, Pat. No. 5,295,196, which is a continuation-in-part of Ser. No. 475,111, Feb. 5, 1990, abandoned.

[51] Int. Cl.$^6$ .................................................... G06K 9/00
[52] U.S. Cl. ........................... 382/135; 209/534; 382/318
[58] Field of Search .................................. 382/7, 58, 62, 382/63, 64, 65, 135, 312, 318, 319, 320, 321; 209/534

[56] References Cited

U.S. PATENT DOCUMENTS

| | | | |
|---|---|---|---|
| 3,509,535 | 6/1966 | Berube | 340/149 |
| 3,612,835 | 10/1971 | Andrews et al. | 235/61.11 D |
| 3,870,629 | 3/1975 | Carter et al. | 209/111.8 |
| 3,906,449 | 9/1975 | Marchak | 340/149 R |
| 3,976,198 | 8/1976 | Carnes et al. | 209/111.7 T |
| 4,041,456 | 8/1977 | Ott et al. | 340/146.3 R |
| 4,096,991 | 6/1978 | Iguchi | 235/419 |
| 4,147,430 | 4/1979 | Gorgone et al. | 356/51 |
| 4,179,685 | 12/1979 | O'Maley | 340/146.3H |
| 4,283,708 | 8/1981 | Lee | 340/146.3 Z |
| 4,288,781 | 9/1981 | Sellner et al. | 340/146.3 Q |
| 4,302,781 | 11/1981 | Ikeda et al. | 358/486 |
| 4,311,914 | 1/1982 | Huber | 250/556 |
| 4,348,656 | 9/1982 | Gorgone et al. | 340/146.3 R |
| 4,349,111 | 9/1982 | Shah et al. | 209/534 |
| 4,352,988 | 10/1982 | Ishida | 250/559 |
| 4,355,300 | 10/1982 | Weber | 340/146.3 C |
| 4,356,473 | 10/1982 | Freudenthal | 340/146.3 H |
| 4,386,432 | 5/1983 | Nakamura et al. | 382/7 |
| 4,442,541 | 4/1984 | Finkel et al. | 382/7 |
| 4,461,028 | 7/1984 | Okubo | 382/15 |
| 4,464,786 | 8/1984 | Nishito et al. | 382/7 |
| 4,464,787 | 8/1984 | Fish et al. | 382/7 |
| 4,490,846 | 12/1984 | Ishida et al. | 382/7 |

(List continued on next page.)

FOREIGN PATENT DOCUMENTS

| | | |
|---|---|---|
| 0077464 | 4/1983 | European Pat. Off. . |
| 0338123 | 10/1989 | European Pat. Off. . |
| 0342647 | 11/1989 | European Pat. Off. . |

OTHER PUBLICATIONS

Mosler Inc. brochure "The Mosler/Toshiba CF–420", 1989.
AFB Currency Recognition System (date not found).

*Primary Examiner*—Leo H. Boudreau
*Assistant Examiner*—Phuoc Tran
*Attorney, Agent, or Firm*—Arnold, White & Durkee

[57] ABSTRACT

An apparatus for currency discrimination comprises first and second stationary scanheads, disposed on opposite sides of a bill transport path, for scanning respective first and second opposing surfaces of a bill traveling along the bill transport path and for producing respective output signals. The bill travels along the transport path in the direction of a predetermined dimension of the bill. A memory stores master characteristic patterns corresponding to associated predetermined surfaces of a plurality of denominations of genuine bills. Sampling circuitry samples the output signals associated with the respective first and second opposing surfaces of the scanned bill. A signal processor is programmed to determine which one of the first and second opposing surfaces corresponds to the associated predetermined surfaces of the plurality of denominations of genuine bills. The processor then correlates the output signal associated with the one of the first and second opposing surfaces corresponding to the associated predetermined surfaces with the master characteristic patterns to identify the denomination of the scanned bill.

20 Claims, 4 Drawing Sheets

U.S. PATENT DOCUMENTS

| | | | |
|---|---|---|---|
| 4,513,439 | 4/1985 | Gorgone et al. | 382/7 |
| 4,539,702 | 9/1985 | Oka | 382/7 |
| 4,556,140 | 12/1985 | Okada | 194/4 |
| 4,563,771 | 1/1986 | Gorgone et al. | 382/7 |
| 4,587,412 | 5/1986 | Apisdorf | 235/449 |
| 4,587,434 | 5/1986 | Roes et al. | 250/556 |
| 4,592,090 | 5/1986 | Curl et al. | 382/7 |
| 4,628,194 | 12/1986 | Dobbins et al. | 235/379 |
| 4,645,936 | 2/1987 | Gorgone | 250/556 |
| 4,653,647 | 3/1987 | Hashimoto | 209/534 |
| 4,677,682 | 6/1987 | Miyagawa et al. | 382/7 |
| 4,700,368 | 10/1987 | Munn et al. | 377/8 |
| 4,733,308 | 3/1988 | Nakamura et al. | 358/496 |
| 4,823,393 | 4/1989 | Kawakami | 382/7 |
| 4,827,531 | 5/1989 | Milford | 382/7 |
| 4,996,604 | 2/1991 | Ogawa et al. | 358/486 |
| 5,047,871 | 9/1991 | Meyer et al. | 358/486 |
| 5,068,519 | 11/1991 | Bryce | 235/449 |

METHOD AND APPARATUS FOR CURRENCY DISCRIMINATION

CROSS-REFERENCE TO RELATED APPLICATIONS

This application is a continuation-in-part of application Ser. No. 08/127,334, filed Sep. 27, 1993, which in turn is continuation of application Ser. No. 07/885,648, filed May 19, 1992, now U.S. Pat. No. 5,295,196, which in turn is a continuation-in-part of application Ser. No. 07/475,111, filed Feb. 5, 1990, and now abandoned.

FIELD OF THE INVENTION

The present invention relates, in general, to currency identification. The invention relates more particularly to a method and apparatus for automatic discrimination of currency bills of different denominations using light reflectivity characteristics of indicia printed upon the currency bills.

BACKGROUND OF THE INVENTION

A variety of techniques and apparatus have been used to satisfy the requirements of automated currency handling systems. At the lower end of sophistication in this area of technology are systems capable of handling only a specific type of currency, such as a specific dollar denomination, while rejecting all other currency types. At the upper end are complex systems which are capable of identifying and discriminating among multiple currency denominations.

Currency discrimination systems typically employ either magnetic sensing or optical sensing for discriminating between different currency denominations. Magnetic sensing is based on detecting the presence or absence of magnetic ink in portions of the printed indicia on the currency by using magnetic sensors, usually ferrite core-based sensors, and using the detected magnetic signals, after undergoing analog or digital processing, as the basis for currency discrimination. The more commonly used optical sensing technique, on the other hand, is based on detecting and analyzing variations in light reflectance or transmissivity characteristics occurring when a currency bill is illuminated and scanned by a strip of focused light. The subsequent currency discrimination is based on the comparison of sensed optical characteristics with prestored parameters for different currency denominations, while accounting for adequate tolerances reflecting differences among individual bills of a given denomination.

A major obstacle in implementing automated currency discrimination systems is obtaining an optimum compromise between the criteria used adequately define the characteristic pattern for a particular currency denomination and the time required to analyze test data and compare it to predefined parameters in order to identify the currency bill under scrutiny. Even with the use of microprocessors for processing the test data resulting from the scanning of a bill, a finite amount of time is required for acquiring samples and for the process of comparing the test data to stored parameters to identify the denomination of the bill.

Some of the optical scanning systems available today employ two optical scanheads disposed on opposite sides of a bill transport path. One of the optical scanheads scans one surface (e.g., green surface) of a currency bill to obtain a first set of reflectance data samples, while the other optical scanhead scans the opposite surface (e.g., black surface) of the currency bill to obtain a second set of reflectance data samples. These two sets of data samples are then processed and compared to stored characteristic patterns corresponding to the green surfaces of currency bills of different denominations. If degree of correlation between either set of data samples and any of the stored characteristic patterns is greater than a predetermined threshold, then the denomination of the bill is positively identified.

A drawback of the foregoing technique for scanning both surfaces of a currency bill is that it is time-consuming to process and compare both sets of data samples for the scanned bill to the stored characteristic patterns. The set of data samples corresponding to the black surface of the scanned bill are processed and compared to the stored characteristic patterns even though no match should be found. As previously stated, the stored characteristic patterns correspond to the green surfaces of currency bills of different denominations.

Another drawback of the foregoing scanning technique is that the set of data samples corresponding to the black surface of the scanned bill occasionally leads to false positive identification of a scanned bill. The reason for this false positive identification is that if a scanned bill is slightly shifted in the lateral direction relative to the bill transport path, the set of data samples corresponding to the black surface of the scanned bill may sufficiently correlate with one of the stored characteristic patterns to cause a false positive identification of the bill. The degree of correlation between the set of "black" data samples and the stored "green" characteristic patterns should, of course, not be greater than the predetermined threshold for positively identifying the denomination of the bill.

SUMMARY OF THE INVENTION

It is a principal object of the present invention to provide an improved method and apparatus for identifying currency bills comprising a plurality of currency denominations.

It is another object of this invention to provide an improved method and apparatus of the above kind which is capable of efficiently discriminating among bills of several currency denominations at a high speed and with a high degree of accuracy.

A related object of the present invention is to provide such an improved currency discrimination apparatus which is compact, economical, and has uncomplicated construction and operation.

Briefly, in accordance with the present invention, the objectives enumerated above are achieved by means of an apparatus for currency discrimination comprises first and second stationary scanheads, disposed on opposite sides of a bill transport path, for scanning respective first and second opposing surfaces of a bill traveling along the bill transport path and for producing respective output signals. The bill travels along the transport path in the direction of a predetermined dimension of the bill. A memory stores master characteristic patterns corresponding to associated predetermined surfaces (e.g., green surfaces) of a plurality of denominations of genuine bills. Sampling circuitry samples the output signals associated with the respective first and second opposing surfaces of the scanned bill. A signal processor is programmed to determine which one of the first and second opposing surfaces corresponds to the associated predetermined surfaces of the plurality of denominations of genuine bills. The processor then correlates the output signal associated with the one of the first and second opposing surfaces corresponding to the associated predetermined surfaces with the master characteristic patterns. If the degree of correlation between the selected output signal and any of the stored characteristic patterns is greater than a predetermined threshold, then the denomination of the bill is positively identified.

Each scanhead uses a pair of light-emitting diodes ("LED's") to focus a coherent light strip of predefined dimensions and having a normalized distribution of light intensity across the illuminated area. The LED's are angularly disposed and focus the desired strip of light onto a preselected dimension (wide or narrow) of a bill positioned flat across the scanning surface of the scanhead. A photodetector detects light reflected from the bill. The photodetector is controlled by an optical encoder to obtain the desired reflectance samples.

For each scanhead, initiation of sampling is based upon detection of the change in reflectance value that occurs when the outer border of the printed pattern on a bill is encountered relative to the reflectance value obtained at the edge of the bill where no printed pattern exists. According to a preferred embodiment of this invention, illuminated strips of at least two different dimensions are used for the scanning process. A narrow strip is used initially to detect the starting point of the printed pattern on a bill and is adapted to distinguish the thin borderline that typically marks the starting point of and encloses the printed pattern on a bill. For the rest of the preselected dimension scanning following detection of the border line of the printed pattern, a substantially wider strip of light is used to collect the predefined number of samples for a bill scan. The generation and storage of characteristic patterns using standard notes and the subsequent comparison and correlation procedure for classifying the scanned bill as belonging to one of several predefined currency denominations is based on the above-described sensing and correlation technique.

BRIEF DESCRIPTION OF THE DRAWINGS

Other objects and advantages of the invention will become apparent upon reading the following detailed description in conjunction with the drawings in which.

Figure 1:
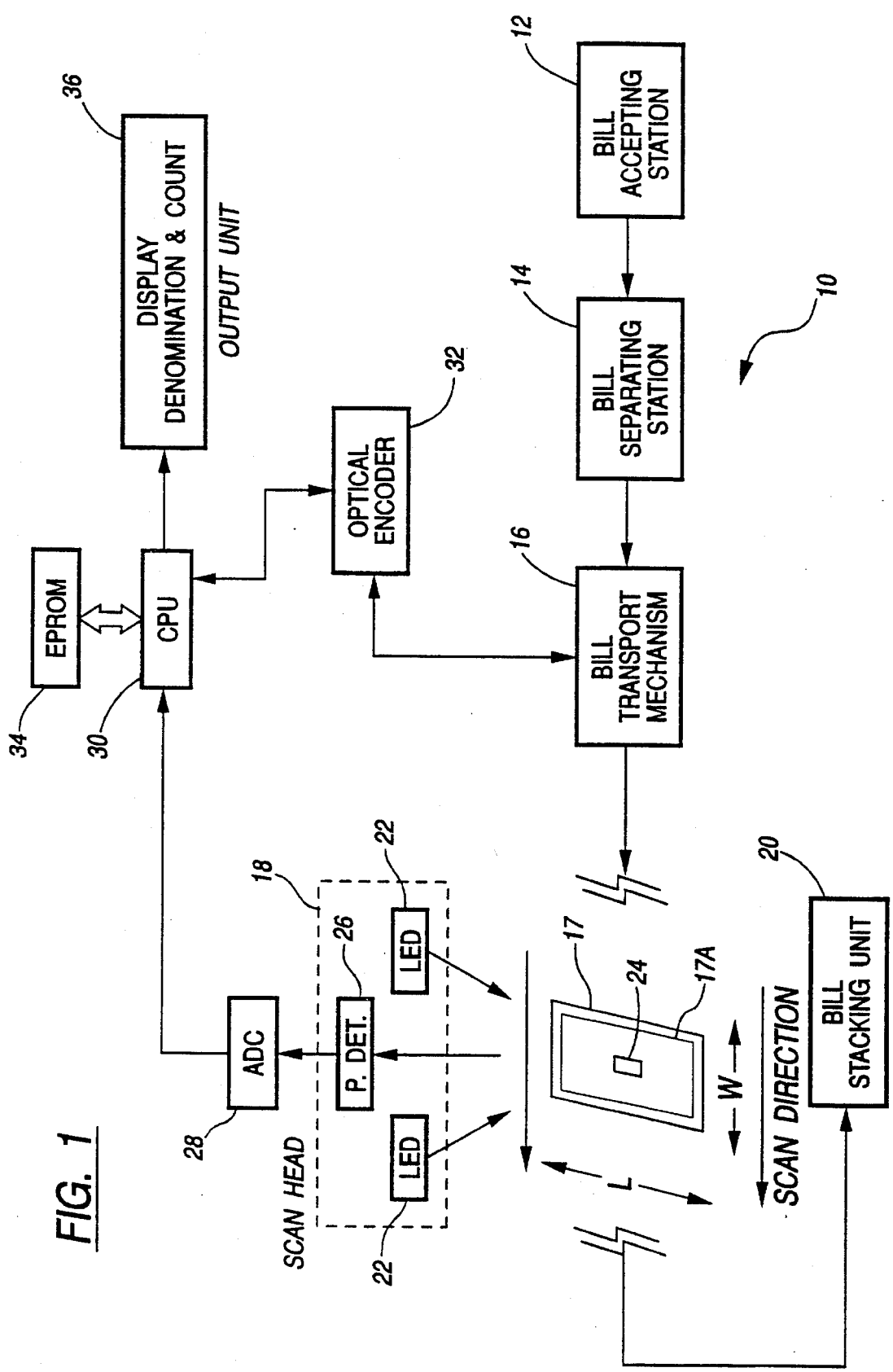
FIG. 1 is a functional block diagram illustrating the conceptual basis for the optical sensing and correlation method and apparatus, according to the system of this invention.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Referring now to FIG. 1, there is shown a functional block diagram illustrating the optical sensing and correlation system according to this invention. The system 10 includes a bill accepting station 12 where stacks of currency bills that need to be identified and counted are positioned. Accepted bills are acted upon by a bill separating station 14 which functions to pick out or separate one bill at a time for being sequentially relayed by a bill transport mechanism 16, according to a precisely predetermined transport path, across a pair of optical scanheads 18 (only one is illustrated in FIG. 1) where the currency denomination of the bill is scanned, identified, and counted at a rate in excess of 800 bills per minute. The scanned bill is then transported to a bill stacking station 20 where bills so processed are stacked for subsequent removal.

Figure 6A:
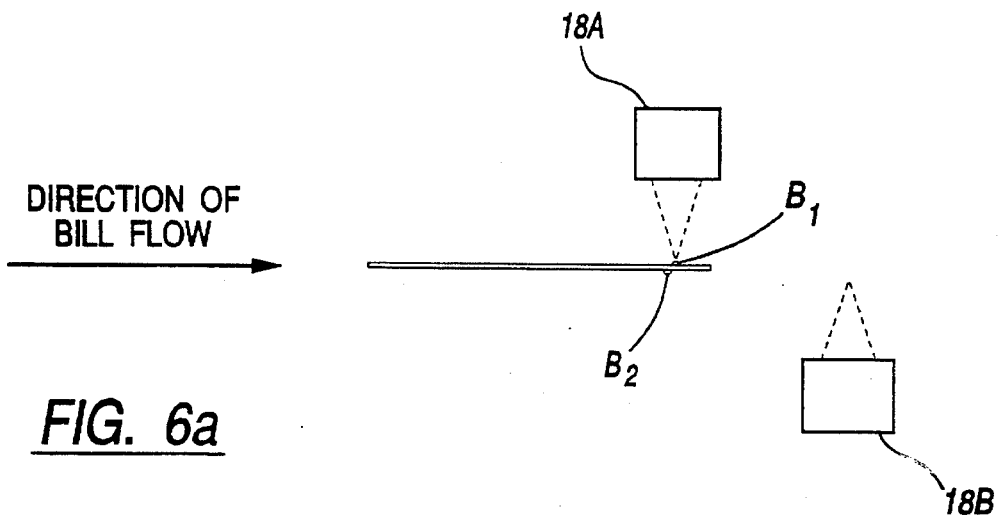
FIG. 6A is a side elevation showing the first surface of a bill scanned by an upper scanhead and the second surface of the bill scanned by a lower scanhead.
Figure 6B:
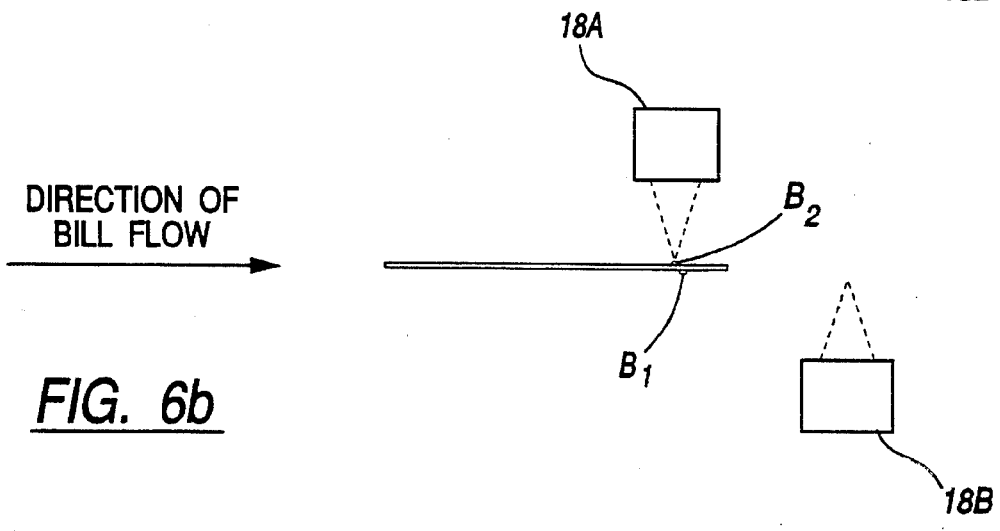
FIG. 6b is a side elevation showing the first surface of a bill scanned by a lower scanhead and the second surface of the bill scanned by an upper scanhead.

The pair of optical scanheads 18 are disposed on opposite sides of the transport path to permit optical scanning of both opposing surfaces of a bill (see FIGS. 6A and 6B). With respect to United States currency, these opposing surfaces correspond to the black and green surfaces of a bill. While FIG. 1 only illustrates a single scanhead 18, it should be understood that another scanhead is substantially identical in construction to the illustrated scanhead. Each optical scanhead 18 comprises at least one light source 22 directing a beam of coherent light onto the bill transport path so as to illuminate a substantially rectangular light strip 24 upon a currency bill 17 positioned on the transport path adjacent the scanhead 18. One of the optical scanheads 18 (the "upper" scanhead 18A in FIG. 6) is positioned above the transport path and illuminates a light strip upon a first surface of the bill, while the other of the optical scanheads 18 (the "lower" scanhead 18B in FIG. 6) is positioned below the transport path and illuminates a light strip upon the second surface of the bill. The surface of the bill scanned by each scanhead 18 is determined by the orientation of the bill relative to the scanheads 18. The upper scanhead 18A is located slightly upstream relative to the lower scanhead 18B. Light reflected off the illuminated strip 24 is sensed by a photodetector 26 positioned directly adjacent the strip.

The photodetector of the upper scanhead 18A produces a first analog output corresponding to the first surface of the bill, while the photodetector of the lower scanhead 18B produces a second analog output corresponding to the second surface of the bill. The first and second analog outputs are converted into respective first and second digital outputs by means of respective analog-to-digital (ADC) convertor units 28 whose outputs are fed as digital inputs to a central processing unit (CPU) 30. As described in detail below, the CPU 30 uses the sequence of operations illustrated in FIG.

7 to determine which of the first and second digital outputs corresponds to the green surface of the bill, and then selects the "green" digital output for subsequent correlation to a series of master characteristic patterns stored in EPROM 34. As explained below, the master characteristic patterns are preferably generated by performing scans on the green surfaces, not black surfaces, of bills of different denominations. The analog output corresponding to the black surface of the bill is not used for subsequent correlation.

The bill transport path is defined in such a way that the transport mechanism 16 moves currency bills with the narrow dimension "W" of the bills being parallel to the transport path and the scan direction. Thus, as a bill 17 moves on the transport path across each scanhead 18, the coherent light strip 24 effectively scans the bill across the narrow dimension "W" of the bill. Preferably, the transport path is so arranged that a currency bill 17 is scanned approximately about the central section of the bill along its narrow dimension, as best shown in FIG. 1. Each scanhead 18 functions to detect light reflected from the respective surface of the bill as it moves across the illuminated light strip 24 and to provide an analog representation of the variation in light so reflected which, in turn, represents the variation in the dark and light content of the printed pattern or indicia on the surface of the bill. This variation in light reflected from the narrow dimension scanning of the bills serves as a measure for distinguishing, with a high degree of confidence, among a plurality of currency denominations which the system of this invention is programmed to handle. In an alternative embodiment, the bills are moved with the wide dimension "L" of the bills positioned parallel to the transport path and the scan direction.

The analog outputs of the photodetectors 26 of each scanhead 18 are digitized under control of the CPU 30 to yield first and second digital outputs corresponding to the respective scanheads 18 with each digital output containing a fixed number of digital reflectance data samples. After selecting the digital output corresponding to the green surface of the bill, the data samples are subjected to a digitizing process which includes a normalizing routine for processing the sampled data for improved correlation and for smoothing out variations due to "contrast" fluctuations in the printed pattern existing on the bill surface. The normalized reflectance data so digitized represents a characteristic pattern that is fairly unique for a given bill denomination and provides sufficient distinguishing features between characteristic patterns for different currency denominations. This process is more fully explained in U.S. application Ser. No. 07/885,648, filed on May 19, 1992, now U.S. Pat. No. 5,295,196 and entitled "Method and Apparatus for Currency Discrimination and Counting," which is incorporated herein by reference.

In order to ensure strict correspondence between reflectance samples obtained by narrow dimension scanning of successive bills, the initiation of the reflectance sampling process is preferably controlled through the CPU 30 by means of an optical encoder 32 which is linked to the bill transport mechanism 16 and precisely tracks the physical movement of the bill 17 across the scanhead 18. More specifically, the optical encoder 32 is linked to the rotary motion of the drive motor which generates the movement imparted to the bill as it is relayed along the transport path. In addition, it is ensured that positive contact is maintained between the bill and the transport path, particularly when the bill is being scanned by each scanhead 18. Under these conditions, the optical encoder is capable of precisely tracking the movement of the bill relative to the light strip generated by each scanhead by monitoring the rotary motion of the drive motor.

The output of the photodetector 26 of each scanhead 18 is monitored by the CPU 30 to detect the starting point of the printed pattern on the bill, as represented by the thin borderline 17A which typically encloses the printed indicia on currency bills. The printed pattern on the black and green surfaces of the bill are each enclosed by respective thin borderlines 17A. Once the borderline 17A has been detected, the optical encoder 32 is used to control the timing and number of reflectance samples that are obtained from the output of the photodetector 26 of each scanhead 18 as the bill 17 moves across each scanhead 18 and is scanned along its narrow dimension.

The detection of the borderline constitutes an important step and realizes improved discrimination efficiency since the borderline serves as an absolute reference point for initiation of sampling. If the edge of a bill were to be used as a reference point, relative displacement of sampling points can occur because of the random manner in which the distance from the edge to the borderline varies from bill to bill due to the relatively large range of tolerances permitted during printing and cutting of currency bills. As a result, it becomes difficult to establish direct correspondence between sample points in successive bill scans and the discrimination efficiency is adversely affected.

The use of the optical encoder for controlling the sampling process relative to the physical movement of a bill across each scanhead is also advantageous in that the encoder can be used to provide a predetermined delay following detection of the borderline prior to initiation of samples. The encoder delay can be adjusted in such a way that the bill is scanned only across those segments along its narrow dimension which contain the most distinguishable printed indicia relative to the different currency denominations.

In the case of U.S. currency, for instance, it has been determined that the central, approximately two-inch portion of currency bills, as scanned across the central section of the narrow dimension of the bill, provides sufficient data for distinguishing among the various U.S. currency denominations on the basis of the correlation technique used in this invention. Accordingly, the optical encoder can be used to control the scanning process so that reflectance samples are taken for a set period of time and only after a certain period of time has elapsed since the borderline has been detected, thereby restricting the scanning to the desired central portion of the narrow dimension of the bill.

Figure 2:
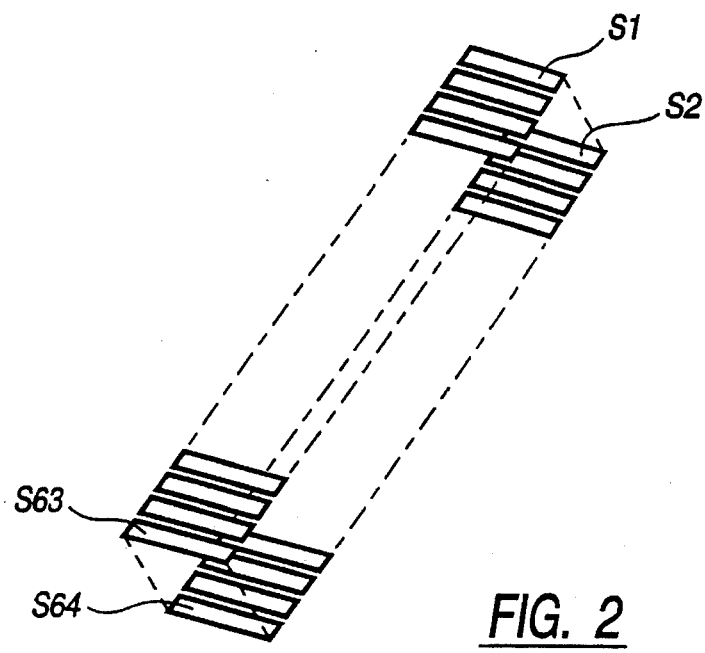
FIG. 2 is a diagrammatic perspective illustration of the successive areas of a surface scanned during the traversing movement of a single bill across one of the two scanheads employed in the preferred embodiment of the present invention.
Figure 3:
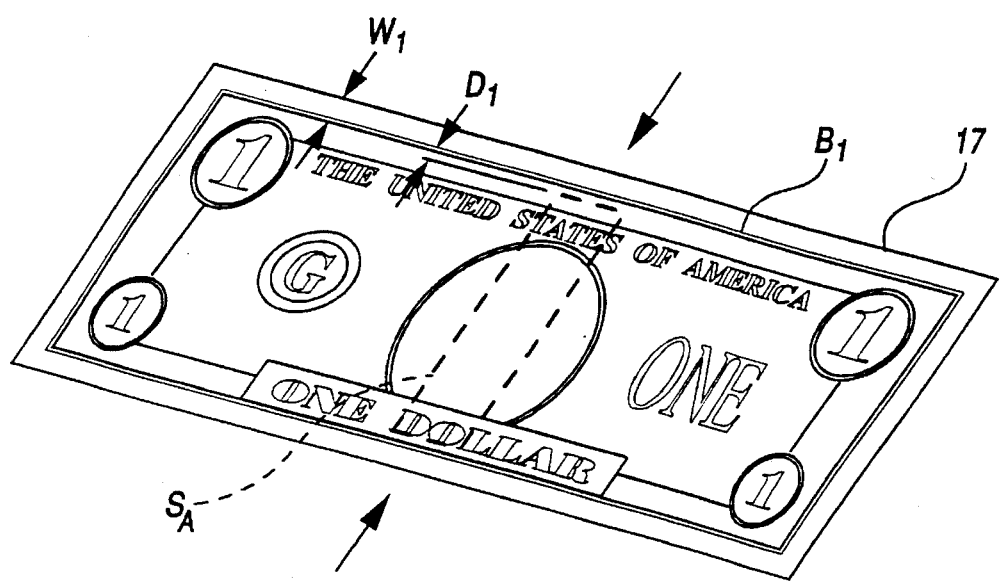
FIG. 3 is a perspective view of a bill showing the preferred area of a first surface to be scanned by one of the two scanheads employed in the preferred embodiment of the present invention.

FIGS. 2–5 illustrate the scanning process in more detail. As a bill is advanced in a direction parallel to the narrow edges of the bill, scanning via the wide slit of one of the scanheads is effected along a segment $S_A$ of the central portion of the black surface of the bill (FIG. 3). As previously stated, the orientation of the bill along the transport path determines whether the upper or lower scanhead scans the black surface of the bill. This segment $S_A$ begins a fixed distance $D_1$ inboard of the border line $B_1$, which is located a distance $W_1$ from the edge of the bill. As the bill traverses the scanhead, a strip s of the segment $S_A$ is always illuminated, and the photodetector produces a continuous output signal which is proportional to the intensity of the light reflected from the illuminated strip s at any given instant. This output is sampled at intervals controlled by the encoder, so that the sampling intervals are precisely synchronized with the movement of the bill across the scanhead.

Figure 5:
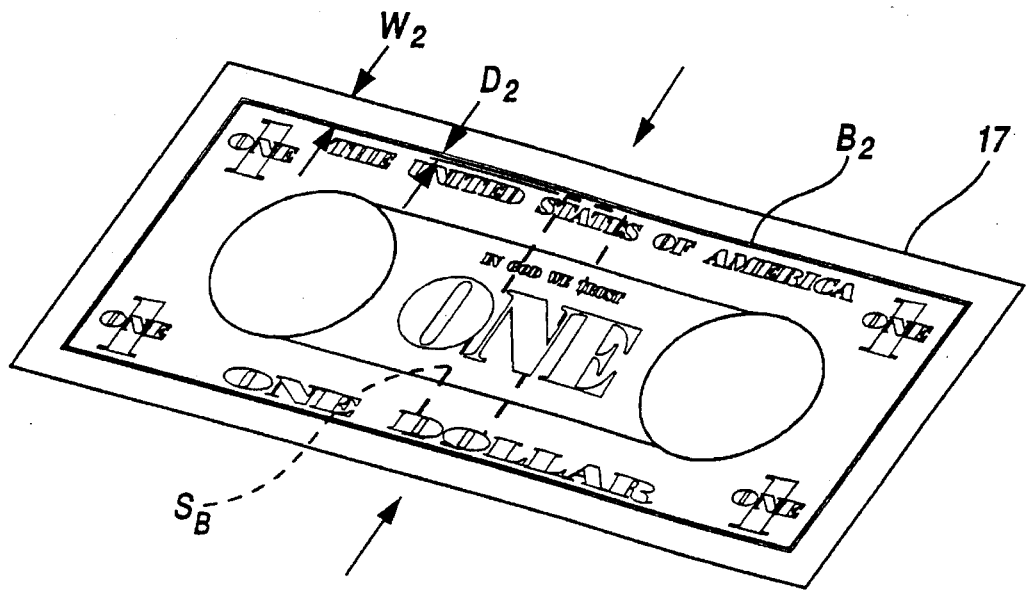
FIG. 5 is another perspective view of the bill in FIG. 3 showing the preferred area of a second surface to be scanned by the other of the scanheads employed in the preferred embodiment of the present invention.

Similarly, the other of the two scanheads scans a segment $S_B$ of the central portion of the green surface of the bill (FIG. 5). The orientation of the bill along the transport path determines whether the upper or lower scanhead scans the green surface of the bill. This segment $S_B$ begins a fixed distance $D_2$ inboard of the border line $B_2$, which is located a distance $W_2$ from the edge of the bill. For U.S. currency, the distance $W_2$ on the green surface is greater than the distance $W_1$ on the black surface. It is this feature of U.S. currency which permits one to determine the orientation of the bill relative to the upper and lower scanheads 18, thereby permitting one to select only the data samples corresponding to the green surface for correlation to the master characteristic patterns in the EPROM 34. As the bill traverses the scanhead, a strip s of the segment $S_B$ is always illuminated, and the photodetector produces a continuous output signal which is proportional to the intensity of the light reflected from the illuminated strip s at any given instant. This output is sampled at intervals controlled by the encoder, so that the sampling intervals are precisely synchronized with the movement of the bill across the scanhead.

Figure 4:
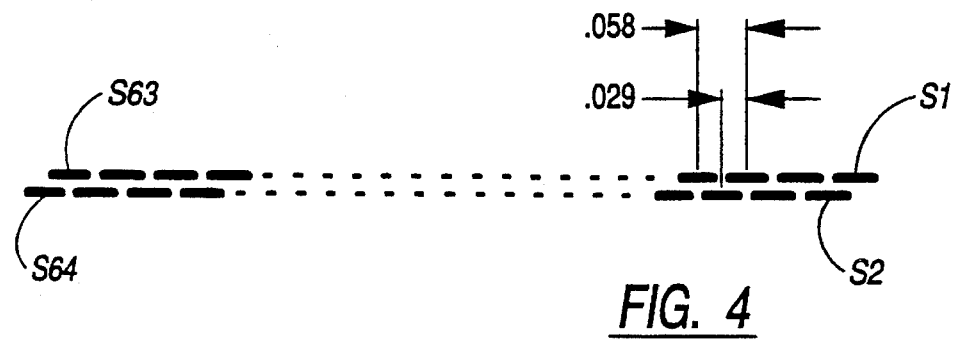
FIG. 4 is a diagrammatic side elevation of the scan areas illustrated in FIG. 2, to show the overlapping relationship of those areas.

As illustrated in FIGS. 2 and 4, it is preferred that the sampling intervals be selected so that the strips s that are illuminated for successive samples overlap one another. The odd-numbered and even-numbered sample strips have been separated in FIGS. 2 and 4 to more clearly illustrate this overlap. For example, the first and second strips s1 and s2 overlap each other, the second and third strips s2 and s3 overlap each other, and so on. Each adjacent pair of strips overlap each other. In the illustrative example, this is accomplished by sampling strips that are 0.050 inch wide at 0.029 inch intervals, along segments $S_A$ and $S_B$ that are each 1.83 inch long (64 samples).

The optical sensing and correlation technique is based upon using the above process to generate a series of master characteristic patterns using standard bills for each denomination of currency that is to be detected. According to a preferred embodiment, two or four characteristic patterns are generated and stored within system memory, preferably in the form of the EPROM 34 (see FIG. 1), for each detectable currency denomination. The characteristic patterns for each bill are generated from optical scans, performed on the green surface of the bill and taken along both the "forward" and "reverse" directions relative to the pattern printed on the bill.

In adapting this technique to U.S. currency, for example, characteristic patterns are generated and stored for seven different denominations of U.S. currency, i.e., $1, $2, $5, $10, $20, $50 and $100. Four characteristic patterns are generated for the $10 bill and the $2 bill, and two characteristic patterns are generated for each of the other denominations. Accordingly, a master set of 18 different characteristic patterns is stored within the system memory for subsequent correlation purposes. Once the master characteristic patterns have been stored, the digitized data samples (i.e., test pattern) corresponding to the green surface of a scanned bill are selected using the sequence of operations in FIG. 7 and are compared by the CPU 30 with each of the 18 pre-stored master characteristic patterns to generate, for each comparison, a correlation number representing the extent of correlation, i.e., similarity between corresponding ones of the plurality of data samples, for the patterns being compared.

The CPU 30 is programmed to identify the denomination of the scanned bill as corresponding to the stored characteristic pattern for which the correlation number resulting from pattern comparison is found to be the highest. In order to preclude the possibility of mischaracterizing the denomination of a scanned bill, as well as to reduce the possibility of spurious notes being identified as belonging to a valid denomination, a bi-level threshold of correlation is required to be satisfied before a particular call is made, for at least certain denominations of bills. More specifically, the correlation procedure is adapted to identify the two highest correlation numbers resulting from the comparison of the test pattern to one of the stored patterns. At that point, a minimum threshold of correlation is required to be satisfied by the higher of these two correlation numbers. As a second threshold level, a minimum separation is prescribed between the two highest correlation numbers before making a call. This ensures that a positive call is made only when a test pattern does not correspond, within a given range of correlation, to more than one stored master pattern. If both of the foregoing two thresholds are satisfied, the CPU 30 positively identifies the denomination of the bill.

Using the above sensing and correlation approach, the CPU 30 is programmed to count the number of bills belonging to a particular currency denomination as part of a given set of bills that have been scanned for a given scan batch, and to determine the aggregate total of the currency amount represented by the bills scanned during a scan batch. The CPU 30 is also linked to an output unit 36 which is adapted to provide a display of the number of bills counted, the breakdown of the bills in terms of currency denomination, and the aggregate total of the currency value represented by counted bills. The output unit 36 can also be adapted to provide a print-out of the displayed information in a desired format.

Figure 7:
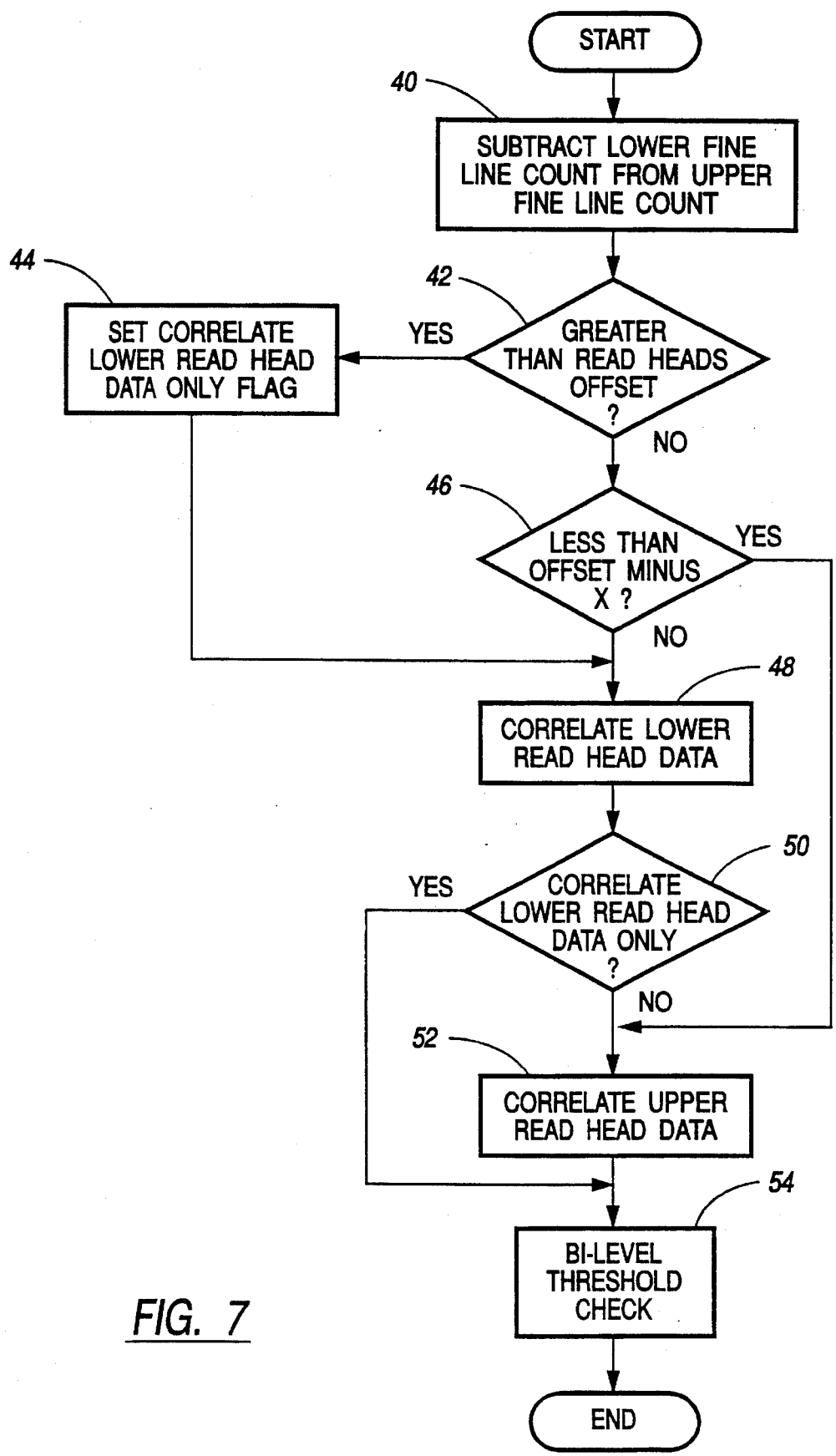
FIG. 7 is a flow chart illustrating the sequence of operations involved in determining the orientation of a bill relative to the upper and lower scanheads.

Referring now to FIGS. 6A, 6B, and 7, the CPU 30 is programmed with the sequence of operations in FIG. 7 to correlate only the test pattern corresponding to the green surface of a scanned bill. As shown in FIGS. 6A and 6B, the upper scanhead 18A is located upstream adjacent the bill transport path relative to the lower scanhead 18B. The distance between the scanheads 18A, 18B in a direction parallel to the transport path corresponds to a predetermined number of encoder counts. It should be understood that the encoder 32 produces a repetitive tracking signal synchronized with incremental movements of the bill transport mechanism, and this repetitive tracking signal has a repetitive sequence of counts (e.g., 65,535 counts) associated therewith. As a bill is scanned by the upper and lower scanheads 18A, 18B, the CPU 30 monitors the output of the upper scanhead 18A to detect the borderline of a first bill surface facing the upper scanhead 18A. Once this borderline of the first surface is detected, the CPU 30 retrieves and stores a first encoder count in memory. Similarly, the CPU 30 monitors the output of the lower scanhead 18B to detect the borderline of a second bill surface facing the lower scanhead 18B. Once the borderline of the second surface is detected, the CPU 30 retrieves and stores a second encoder count in memory.

Referring to FIG. 7, the CPU 30 is programmed to calculate the difference between the first and second encoder counts (step 40). If this difference is greater than the predetermined number of encoder counts corresponding to the distance between the scanheads 18A, 18B (step 42), the bill is oriented with its black surface facing the upper scanhead 18A and its green surface facing the lower scanhead 18B. This can best be understood by reference to FIG. 6A, which shows a bill with the foregoing orientation. In this situation, once the borderline $B_1$ of the black surface passes beneath the upper scanhead 18A and the first encoder count is stored, the borderline $B_2$ still must travel for a distance greater than the distance between the upper and lower scanheads 18A, 18B in order to pass over the lower scanhead 18B. As a result, the difference between the second encoder count associated with the borderline $B_2$ and the first encoder count associated with the borderline $B_1$ will be greater than the predetermined number of encoder counts corresponding to the distance between the scanheads 18A, 18B. With the bill oriented as in FIG. 6A, the CPU 30 sets a flag to indicate that the test pattern produced by the lower scanhead 18B should be correlated (step 44). Next, this test pattern is correlated with the master characteristic patterns stored in memory (step 48).

If at step 42 the difference between the first and second encoder counts is less than the predetermined number of encoder counts corresponding to the distance between the scanheads 18A, 18B, the CPU 30 is programmed to determine whether the difference between the first and second encoder counts is less than the predetermined number minus some safety number "X", e.g., 20 (step 46). If the answer is negative, the orientation of the bill relative to the scanheads 18A, 18B is uncertain so the CPU 30 is programmed to correlate the test patterns produced by both the upper and lower scanheads 18A, 18B with the master characteristic patterns stored in memory (steps 48, 50, and 52).

If the answer is affirmative, the bill is oriented with its green surface facing the upper scanhead 18A and its black surface facing the lower scanhead 18B. This can best be understood by reference to FIG. 6B, which shows a bill with the foregoing orientation. In this situation, once the borderline $B_2$ of the green surface passes beneath the upper scanhead 18A and the first encoder count is stored, the borderline $B_1$ must travel for a distance less than the distance between the upper and lower scanheads 18A, 18B in order to pass over the lower scanhead 18B. As a result, the difference between the second encoder count associated with the borderline $B_1$ and the first encoder count associated with the borderline $B_2$ should be less than the predetermined number of encoder counts corresponding to the distance between the scanheads 18A, 18B. To be on the safe side, it is required that the difference between first and second encoder counts be less than the predetermined number minus the safety number "X". Therefore, the CPU 30 is programmed to correlate the test pattern produced by the upper scanhead 18A (step 52).

After correlating the test pattern associated with either the upper scanhead 18A, the lower scanhead 18B, or both scanheads 18A, 18B, the CPU 30 is programmed to perform the bi-level threshold check described previously (step 54).

While the present invention has been described with reference to one or more particular embodiments, those skilled in the art will recognize that many changes may be made thereto without departing from the spirit and scope of the present invention. For example, the optical scanheads 18A, 18B may be substituted with scanheads which use magnetic sensing, conductivity sensing, capacitive sensing, or mechanical sensing. Each of these embodiments and obvious variations thereof is contemplated as falling within the spirit and scope of the claimed invention, which is set forth in the following claims.

What is claimed is:

1. An apparatus for currency discrimination, comprising;
    first and second stationary scanheads, disposed on opposite sides of a bill transport path, for scanning respective first and second opposing surfaces of each bill of a plurality of bills traveling downstream along said bill transport path and for producing output signals associated with said respective first and second surfaces of each bill, said bills traveling between said scanheads in the direction of a predetermined dimension of said bills at a rate in excess of about 800 bills per minute, each scanned bill having a primary characteristic pattern on one of said first and second surfaces and a secondary characteristic pattern on the other of said first ad second surfaces;
    a memory for storing master primary characteristic patterns of a plurality of denominations of genuine bills;
    sampling means for sampling said output signals associated with said respective first and second opposing surfaces of each scanned bill; and
    signal processing means for
        (1) determining which surface of said first and second opposing surfaces of each scanned bill includes said primary characteristic pattern in response to said first and second scanheads scanning portions of said first and second opposing surfaces of each bill, and
        (2) in response to determining which surface of said first and second opposing surfaces of each scanned bill includes said primary characteristic pattern to a predetermined degree of certainty, correlating only an output signal associated with said surface of each scanned bill which includes said primary characteristic pattern with said master primary characteristic patterns to identify the denomination of each scanned bill.

2. The apparatus of claim 1, wherein said master primary characteristic patterns are on the green surfaces of United States currency bills.

3. The apparatus of claim 1, wherein said first and second scanheads are optical scanheads each including at least one light source for illuminating a strip of a preselected segment of a central portion of each bill, and at least one detector for receiving reflected light from the illuminated strip on each bill.

4. The apparatus of claim 1, wherein said first scanhead is disposed upstream relative to said second scanhead in the direction of said transport path.

5. The apparatus of claim 4, further including a bill transport mechanism for transporting each bill downstream along said transport path, and further including an encoder, linked to said bill transport mechanism, for generating a repetitive sequence of counts while each bill moves downstream along said transport path, and wherein the distance between said first and second scanheads in the direction of said transport path corresponds to a predetermined number of encoder counts.

6. The apparatus of claim 5, wherein said signal processing means
    (1) retrieves a first encoder count in response to said first scanhead detecting a leading borderline of the printed image on said first surface of each bill,
    (2) retrieves a second encoder count in response to said second scanhead detecting a leading borderline of the printed image on said second surface of each bill,
    (3) determines the difference between said first and second encoder counts, and
    (4) compares said difference between said first and second encoder counts to said predetermined number.

7. The apparatus of claim 6, wherein said signal processing means correlates said output signal associated with said second surface with said master primary characteristic patterns if said difference between said first and second encoder counts is greater than said predetermined number.

8. The apparatus of claim 7, wherein said signal processing means correlates said output signal associated with said first surface with said master primary characteristic patterns if said difference between said first and second encoder counts is less than said predetermined number minus a relatively small safety value.

9. The apparatus of claim 8, wherein said signal processing means correlates said output signals associated with said first and second surfaces with said master primary characteristic patterns if said difference between said first and second encoder counts is less than said predetermined number and greater than said predetermined number minus said safety value.

10. A method for currency discrimination, comprising:

transporting a plurality of bills along a bill transport path between first and second stationary scanheads disposed on opposite sides of said transport path, said bills traveling downstream between said scanheads in the direction of a predetermined dimension of said bill at a rate in excess of about 800 bills per minute;

scanning first and second opposing surfaces of each bill using said respective first and second scanheads as each bill travels downstream between said scanheads, and producing output signals associated therewith, each scanned bill having a primary characteristic pattern on one of said first and second surfaces and a secondary characteristic pattern on the other of said first and second surfaces;

sampling said output signals associated with said respective first and second opposing surfaces of each scanned bill;

storing master primary characteristic patterns of a plurality of denominations of genuine bills;

determining which surface of said first and second opposing surfaces of each scanned billed includes said primary characteristic pattern in response to said first and second scanheads scanning portions of said first and second opposing surfaces of each bill; and in response to determining which surface of said first and second opposing surfaces of each scanned bill includes said primary characteristic pattern to a predetermined degree of certainty, correlating only an output signal associated with said surface of each scanned bill which includes said primary characteristic pattern with said master primary characteristic patterns to identify the denomination of each scanned bill.

11. The method of claim 10, wherein said master primary characteristic patterns are on the green surfaces of United States currency bills.

12. The method of claim 10, wherein said first and second scanheads are optical scanheads, and wherein said scanning step includes illuminating a strip of a preselected segment of a central portion of each bill, and detecting reflected light from the illuminated strip on each bill.

13. The method of claim 10, wherein said first scanhead is disposed upstream relative to said second scanhead in the direction of said transport path.

14. The method of claim 13, wherein the step of transporting the plurality of bills along the transport path uses a bill transport mechanism, and further including the step of using an encoder, linked to the bill transport mechanism, to generate a repetitive sequence of counts while each bill moves downstream along said transport path, the distance between said first and second scanheads in the direction of said transport path corresponding to a predetermined number of encoder counts.

15. The method of claim 14, wherein said determining step includes:
(1) retrieving a first encoder count in response to said first scan head detecting a leading borderline of the printed image on said first surface of each bill,
(2) retrieving a second encoder count in response to said second scanhead detecting a leading borderline of the printed image on said second surface of each bill,
(3) determining the difference between said first and second encoder counts, and
(4) comparing said difference between said first and second encoder counts to said predetermined number.

16. The method of claim 15, wherein said correlating step includes correlating said output signal associated with said second surface with said master primary characteristic patterns if said difference between said first and second encoder counts is greater than said predetermined number.

17. The method of claim 16, wherein said correlating step includes correlating said output signal associated with said first surface with said master primary characteristic patterns if said difference between said first and second encoder counts is less than said predetermined number minus a relatively small safety value.

18. The method of claim 17, wherein said correlating step includes correlating said output signals associated with said first and second surfaces with said master primary characteristic patterns if said difference between said first and second encoder counts is less than said predetermined number and greater than said predetermined number minus said safety value.

19. A method for currency discrimination, comprising:

using a bill transport mechanism to transport a plurality of bills along a bill transport path between first and second stationary scanheads disposed on opposite sides of said transport path, said first scanhead being disposed upstream relative to said second scanhead in the direction of said transport path, said bills traveling downstream between said scanheads in the direction of a predetermined dimension of said bill at a rate in excess of about 800 bills per minute;

using an encoder, linked to the bill transport mechanism, to generate a repetitive sequence of counts while said bill moves downstream along said transport path, the distance between said first and second scanheads in the direction of said transport path corresponding to a predetermined number of encoder counts;

scanning first and second opposing surfaces of each bill using said respective first and second scanheads as each bill travels downstream between said scanheads, and producing output signals associated therewith, each scanned bill having a primary characteristic pattern on one of said first and second surfaces and a secondary characteristic pattern on the other of said first and second surfaces;

sampling said output signals associated with said respective first and second opposing surfaces of each scanned bill;

storing master primary characteristic patterns of a plurality of denominations of genuine bills;

retrieving a first encoder count in response to said first scanhead detecting a leading borderline of the printed image on said first surface of each bill;

retrieving a second encoder count in response to said second scanhead detecting a leading borderline of the printed image on said second surface of each bill;

calculating the difference between said first and second encoder counts;

comparing said difference between said first and second encoder counts to said predetermined number;

comparing said output signal associated with said second surface with said master primary characteristic patterns in response to said difference between said first and second encoder counts being greater than said predetermined number; and comparing said output signal associated with said first surface with said master primary characteristic patterns in response to said difference between said first and second encoder counts being less than said predetermined number minus a relatively small safety value.

20. A method for currency discrimination, comprising:

transporting a plurality of bills along a bill transport path between first and second stationary scanheads disposed on opposite sides of said transport path, said bills traveling downstream between said scanheads in the direction of a predetermined dimension of said bill at a rate in excess of about 800 bills per minute;

scanning first and second opposing surfaces of each bill using said respective first and second scanheads as each bill travels downstream between said scanheads, and producing output signals associated therewith, each scanned bill having a primary characteristic pattern on one of said first and second surfaces and a secondary characteristic pattern on the other of said first and second surfaces;

sampling said output signals associated with said respective first and second opposing surfaces of each scanned bill;

storing master primary characteristic patterns of a plurality of denominations of genuine bills;

using said first scanhead to detect a leading borderline of the printed image on said first surface of each bill;

using said second scanhead to detect a leading borderline of the printed image on said second surface of each bill;

in response to using said first and second scanheads to detect the leading borderlines of the printed images on said respective first and second surfaces of each bill, determining which surface of said first and second opposing surfaces of each scanned billed includes said primary characteristic pattern; and in response to determining which surface of said first and second opposing surfaces of each scanned bill includes said primary characteristic pattern to a predetermined degree of certainty, correlating only an output signal associated with said surface of each scanned bill which includes said primary characteristic pattern with said master primary characteristic patterns to identify the denomination of each scanned bill.

* * * * *